US008746941B2

(12) United States Patent
Yamagata et al.

(10) Patent No.: US 8,746,941 B2
(45) Date of Patent: Jun. 10, 2014

(54) VEHICULAR HEADLAMP HAVING PARTICULAR STRUCTURE OF THE SHADE

(75) Inventors: Shinji Yamagata, Hadano (JP); Takashi Akutagawa, Kawasaki (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 13/598,850

(22) Filed: Aug. 30, 2012

(65) Prior Publication Data

US 2013/0051054 A1 Feb. 28, 2013

(30) Foreign Application Priority Data

Aug. 30, 2011 (JP) ................................ 2011-186678

(51) Int. Cl.
*B60Q 1/04* (2006.01)

(52) U.S. Cl.
USPC .......................................... 362/539; 362/538

(58) Field of Classification Search
CPC ........................................................ B60Q 1/04
USPC .......................................... 362/538–539, 518
See application file for complete search history.

(56) References Cited

U.S. PATENT DOCUMENTS

2008/0239741 A1* 10/2008 Nakada et al. ................ 362/507
2009/0257240 A1* 10/2009 Koike ........................... 362/538
2010/0002457 A1* 1/2010 Takada .......................... 362/509
2010/0309679 A1* 12/2010 Yamagata et al. ............ 362/539

FOREIGN PATENT DOCUMENTS

JP 2008-77890 A 4/2008
JP 2010-118203 A 5/2010
JP 2010-129321 A 6/2010
JP 2010-165474 A 7/2010

* cited by examiner

*Primary Examiner* — Karabi Guharay
(74) *Attorney, Agent, or Firm* — Kenealy Vaidya LLP

(57) ABSTRACT

A vehicle headlamp includes a light source, a reflector, a projection lens, and a shade. The shade has an upper end edge portion and a raised portion. The upper end edge portion has a projection. The reflector reflects light output from the light source in the front direction. The projection lens in front of the light source projects the light. The shade between the reflector and the projection shields a portion of the light. The upper end edge portion contributes to form the upper end line of the low beam as a cut-off line. The projection contributes to form a recession of the cut-off line recessed below a specific point in the low beam. The raised portion reflects the light having passed above the projection to illuminate an inner region of the recession.

1 Claim, 8 Drawing Sheets

VEHICULAR HEADLAMP HAVING PARTICULAR STRUCTURE OF THE SHADE

This application claims the priority benefit under 35 U.S.C. §119 of Japanese Patent Application No. 2011-186678 filed on Aug. 30, 2011, which is hereby incorporated in its entirety by reference.

FIELD

The presently disclosed subject matter relates to a vehicle lighting device.

DESCRIPTION OF THE RELATED ART

Heretofore, as a vehicle headlamp such as a headlight for an automobile, a so-called projector-type vehicle headlamp has been known, as illustrated in FIG. 7. In such a projector-type vehicle headlamp, the light output from a light source 61 is projected in the front direction of the vehicle through a projection lens 63 after having been reflected by a reflector 62. In the projector-type vehicle headlamp, a portion of the light to be incident on the projection lens 63 is shielded by a shade 64 provided between the reflector 62 and the projection lens 63. Thus, as illustrated in FIG. 8, a low beam LB is generated by the light illuminating only below a cut-off line CL positioned on a substantially horizontal line. Here, “H” and “V” in the drawings represent “horizontal” and “vertical”, respectively.

In the vehicle headlamp, in order to suppress glare against an oncoming vehicle, an illuminance of a specific point P below the cut-off line CL of the low beam LB on an oncoming lane side (for example, at a 50R point (0.86D-3.43R) on a virtual screen in the ECE Regulation) is required to be equal to or lower than a predetermined maximum value.

In response to the requirement, a projector-type vehicle headlamp having the shade 64 in a modified shape has been proposed.

For example, in a vehicle headlamp disclosed in Japanese Patent Application Laid Open Publication No. 2010-129321, a shade 64A on which a dent 64*a* is formed is provided as illustrated in FIG. 9A. The upper surface of the shade 64A is a reflection surface to reflect the light reflected by the reflector 62 onto the projection lens 63. The dent 64*a* is formed at a portion of the upper surface of the shade 64A where the light is reflected, if the dent 64*a* is not provided, to illuminate a region Pa including the specific point P through the projection lens 63. Thus, the dent 64*a* reflects the light reflected the reflector 62 and incident on the dent 64*a* towards directions other than a direction in which the projection lens 63 exists. Thus, as illustrated in FIG. 10A, the amount of light illuminating the region Pa including the specific point P is reduced and the illuminance of the region Pa is suppressed.

Further, in vehicle headlamps disclosed in Japanese Patent Application Laid Open Publications No. 2008-77890, No. 2010-118203, and No. 2010-165474, a shade 64B having a protrusion 64*b* formed on the upper surface thereof is provided as illustrated in FIG. 9B. The upper surface of the shade 64B is a reflection surface like the upper surface of the shade 64A. The protrusion 64*b* is formed in a portion corresponding to a portion of the shade 64A, which portion of the shade 64A including a dent 64*a*. FIG. 9B illustrates a state where the protrusion 64*b* is in a line with an upper end edge E, which contributes to form the cut-off line CL. Thus, as illustrated in FIG. 10B, the amount of light illuminating the region Pa including the specific point P is reduced and the illuminance of the region Pa is suppressed.

Still further, as illustrated in FIG. 9C, a shade 64C on which a projection 64*c* is formed can be used. The projection 64*c* is formed such that a portion of the upper end edge E projects upward. Thus, a portion of the cut-off line CL is recessed below the specific point P in a concave manner. By using the shade 64C, as illustrated in FIG. 10C, the light illuminating towards the specific point P is shielded. Thus, the cut-off line CL is recessed in a concave manner, and the illuminance of the specific point P is suppressed.

However, in the vehicle headlamp of Japanese Patent Application Laid Open Publication No. 2010-129321, among light incident on the upper surface of the shade 64A, only the light incident on the dent 64*a* does not illuminate the front direction of the vehicle. Thus, the region Pa is excessively dark because the light does not illuminate the region Pa and illumination unevenness with the surrounding region becomes noticeable.

Similarly, as in the vehicle headlamps of Japanese Patent Application Laid Open Publications No. 2008-77890, No. 2010-118203, and No. 2010-165474, only the light incident on the protrusion 64*b* does not illuminate the front direction of the vehicle. Thus, the region Pa is excessively dark and the illumination unevenness with the surroundings also becomes noticeable.

Further, even when using the shade 64C, a region inside the recessed portion of the cut-off line CL becomes completely dark, and the illumination unevenness with the surroundings becomes noticeable.

SUMMARY

The presently disclosed subject matter is made to solve at least one of the above problems, and to provide a vehicle headlamp in which the illuminance of the specific point of the low beam can be suppressed while making an illumination gradient gentle around the specific point of the low beam.

To solve at least one of the above problems, according to an aspect of the presently disclosed subject matter, there is provided a vehicle headlamp for generating a low beam in front of the vehicle, including a light source; a reflector to project light output from the light source; a projection lens provided in front of the reflector to project the light reflected by the reflector and to be incident on the projection lens; and a shade provided between the reflector and the projection lens to shield a portion of the light to incident to the projection lens, the shade having an upper end edge portion and a raised portion, which upper end edge portion provided in the vicinity of a focal point of the projection lens to form a cut-off line that is an upper end line of the low beam; the upper end edge portion having a projection that projects upward to form a recession of the cutoff line by making a portion of the cut-off line recessed below a specific point in the low beam, and which raised portion provided to reflect light having passed above the projection to illuminate an inner area of the recession by the light having passed above the projection.

DETAILED DESCRIPTION OF EXEMPLARY EMBODIMENTS

Hereafter, an embodiment of the presently disclosed subject matter is described with reference to the drawings.

Figure 1:
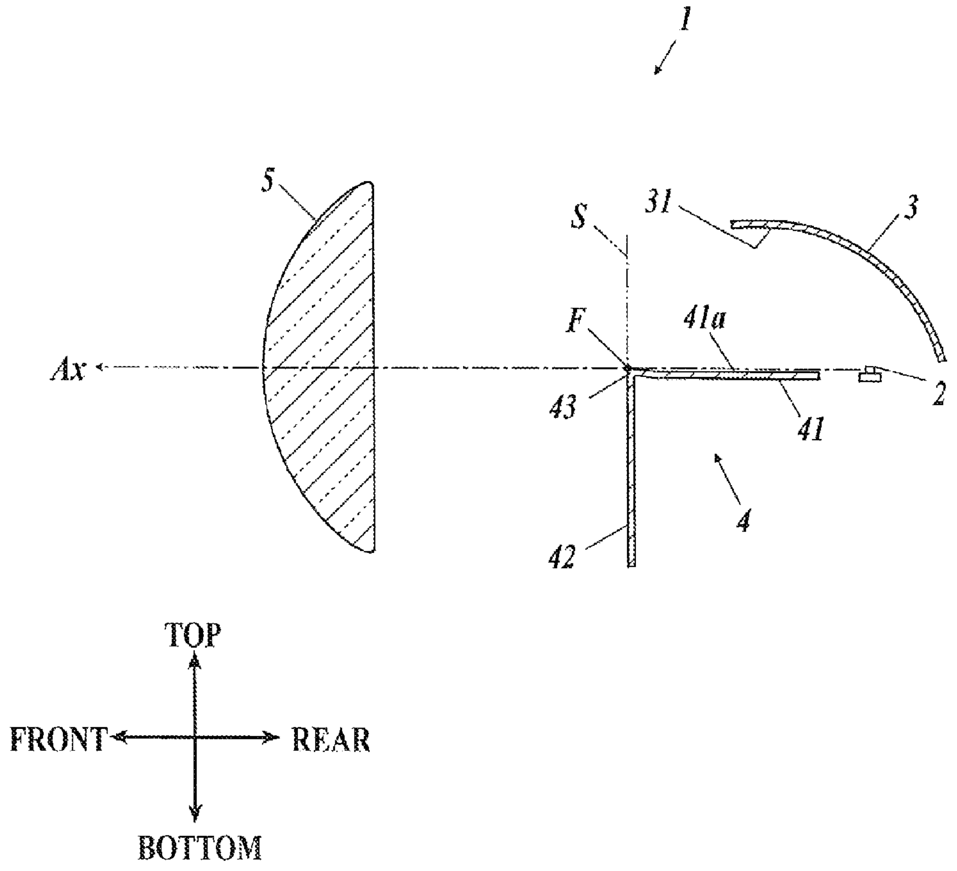
FIG. 1 is a side cross-sectional view of a vehicle headlamp according to an embodiment of the presently disclosed subject matter.

FIG. 1 is a side cross-sectional view of a vehicle headlamp 1 of the embodiment.

Here, in the following description, "front", "rear", "left", "right", "top", and "bottom" indicate directions viewed from the vehicle headlamp 1 or from a vehicle with which the vehicle headlamp 1 is equipped, and used in correspondence with those in the drawings.

As illustrated in FIG. 1, the vehicle headlamp 1 is a projector-type headlamp, which is equipped with a vehicle (not illustrated) and generates a predetermined light distribution pattern (a low beam) in the front direction of the vehicle. The vehicle headlamp 1 includes a light source 2, a reflector 3, a shade 4 and a projection lens 5.

The light source 2 is a light emitting diode (LED) arranged such that an emission surface thereof faces upwards. Here, the light source 2 may be other type of light source such as a light bulb or a laser diode (LD).

The reflector 3 is formed in a concave plate shape having an opening in the front and obliquely downward direction, and arranged above the light source 2 to cover the same. The front surface (a lower surface) of the reflector 3 is a reflection surface 31 to reflect the light output from the light source 2. The reflection surface 31 is a free-form (sculptured) surface and formed based on an ellipsoid of revolution (a spheroid) of which a position of the light source 2 is the primary focal point (a rear focal point). The reflection surface 31 reflects the light output from the light source 2 in the front direction to condense the light at the secondary focal point (a front focal point).

The projection lens 5 is a plano-convex lens with the front side being convex and has an optical axis Ax along the front and the rear direction. The projection lens 5 is provided in front of the reflector 3 so that a focal point F (a rear focal point) on the optical axis Ax is positioned near the secondary focal point of the reflection surface 31. The projection lens 5 projects the light reflected by the reflection surface 31 or an upper surface 41*a* of the shade 4 (described later) in the front direction of the vehicle. More specifically, the projection lens 5 reversely projects an image formed on a focal plane S including the focal point F in the front direction of the vehicle by the light reflected by the reflection surface 31 or the upper surface 41*a* of the shade 4.

Figure 2:
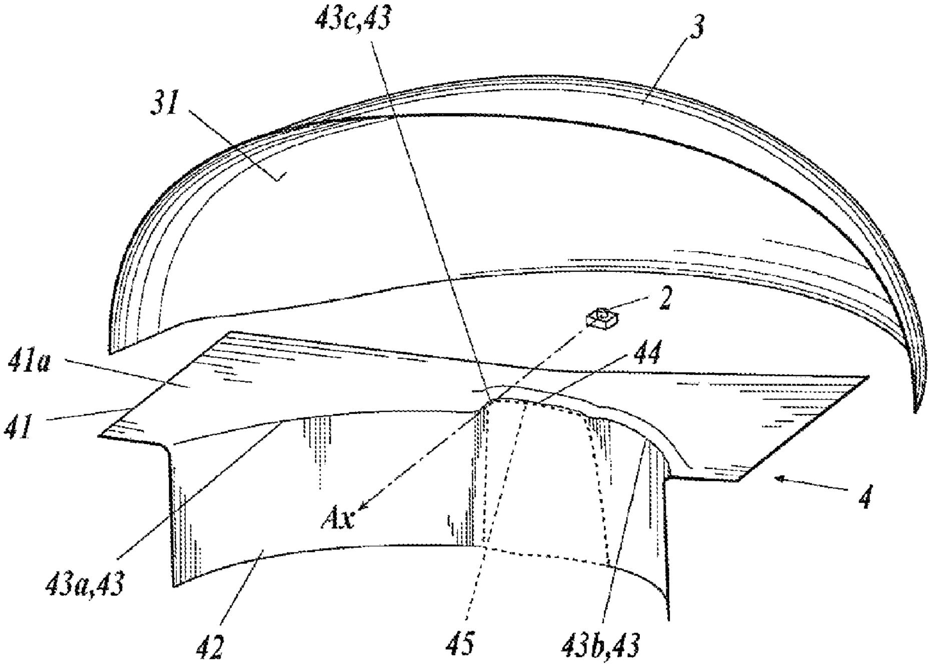
FIG. 2 is a perspective view illustrating a principal part of the vehicle headlamp according to the embodiment.
Figure 2:
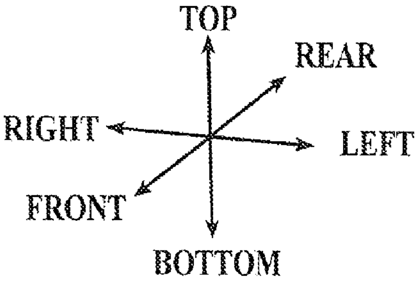
Figure 3:
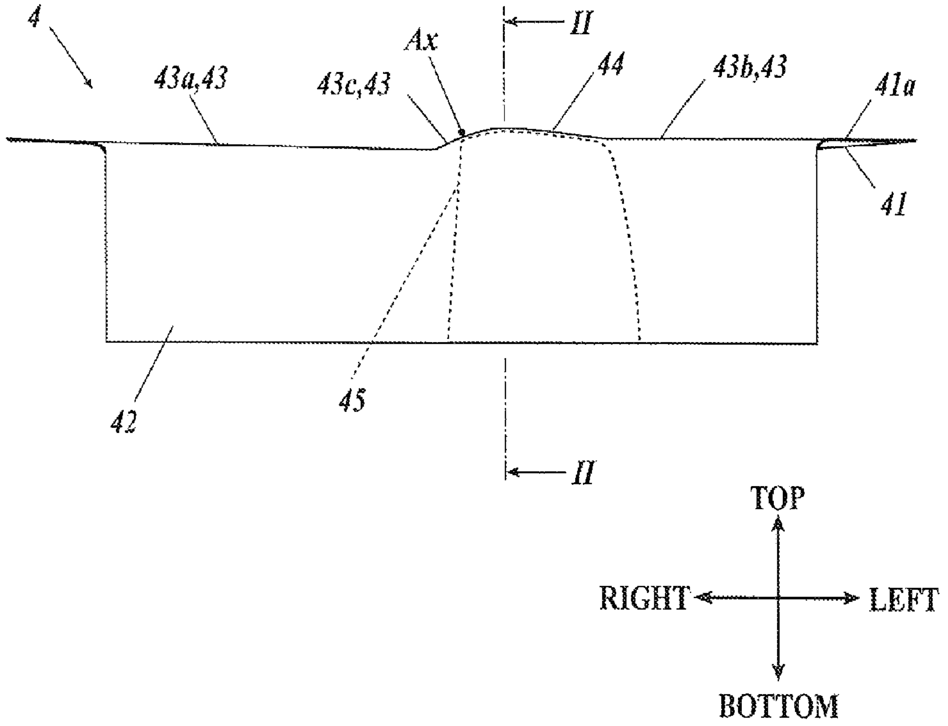
FIG. 3 is a front view of a shade according to the embodiment.
Figure 4:
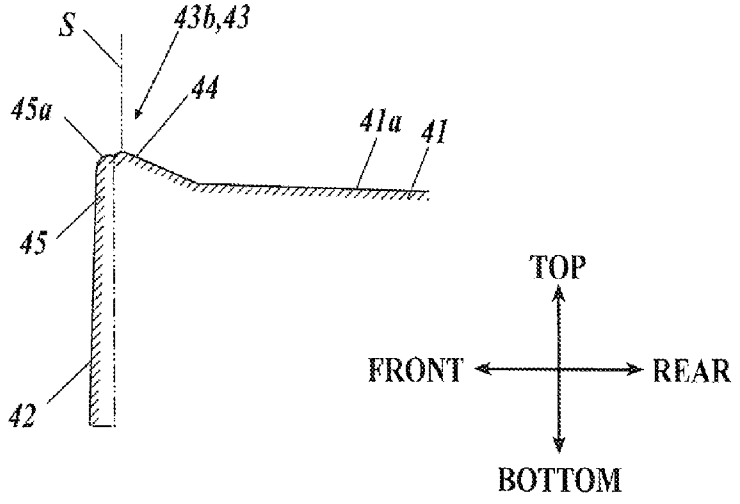
FIG. 4 is a cross-sectional view along a line II-II in FIG. 3.
Figure 5:
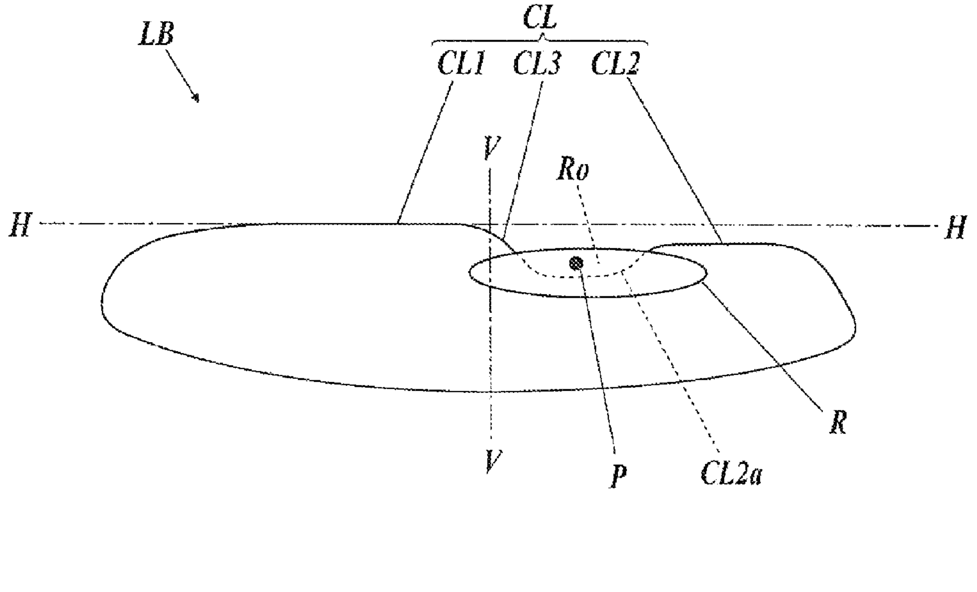
FIG. 5 is a view illustrating a low beam generated on a virtual screen in front of a vehicle by the vehicle headlamp according to the embodiment.

FIG. 2 is a perspective view illustrating a principal part of the vehicle headlamp 1. FIG. 3 is a front view of the shade 4. FIG. 4 is a cross-sectional view along a line II-II in FIG. 3. FIG. 5 is a view illustrating a low beam LB generated on a virtual screen in front of the vehicle by the vehicle headlamp 1.

As illustrated in FIGS. 1 to 5, the shade 4 is arranged between the reflector 3 and the projection lens 5. The shade 4 shields a portion of light reflected by the reflector 3 and to be incident on the projection lens 5, and generates the low beam LB, which has a cut-off line CL on the upper end thereof, on the virtual screen in front of the vehicle. More specifically, the shade 4 has a top plate portion 41 formed to be substantially horizontal and a front plate portion 42 formed continuously from a front end of the top plate portion 41. In the shade 4, the upper surface 41*a* of the top plate portion 41 is a reflection surface treated with aluminum vapor deposition, so that the light reflected by the reflection surface 31 of the reflector 3 and incident on the upper surface 41*a* is reflected by the upper surface 41*a* towards the projection lens 5 positioned in front thereof. Further, the front plate portion 42 curves more towards the front as a position from the optical axis Ax becomes more distant in both right and left directions. An upper end edge portion 43 of the front plate portion 42 is formed continuously along the front end of the top plate portion 41.

The upper end edge portion 43 is arranged in the vicinity of the focal point F of the projection lens 5 and curves more towards the front as a position from the optical axis Ax becomes more distant in both right and left directions. The upper end edge portion 43 contributes to form the cut-off line CL which is an upper end line (borderline between light and dark regions) of the low beam LB, and is arranged so that the light passed close to points of the upper end edge portion 43 illuminates the cut-off line CL. More specifically, the upper end edge portion 43 includes a right-half portion 43*a* formed to be substantially horizontal, a left-half portion 43*b* formed to be positioned a slightly higher than the right-half portion 43*a*, and a center portion 43*c* obliquely connecting the right-half portion 43*a* and the left-half portion 43*b*. The right-half portion 43*a* of the upper end edge portion 43 contributes to form a horizontal cut-off line CL1 on a driving lane side, which is a left side of the cut-off line CL. The left-half portion 43*b* of the upper end edge portion 43 contributes to form a horizontal cut-off line CL2 on an oncoming lane side, which is a right side of the cut-off line CL and is slightly lower than the cut-off line CL1. The center portion 43*c* of the upper end edge portion 43 contributes to form an oblique cut-off line CL3 connecting the horizontal cut-off line CL1 on the driving lane side and the horizontal cut-off line CL2 on the oncoming lane side.

In the upper end edge portion 43, a projection 44 projecting upward is formed on the left-half portion 43*b*, which contributes to form the horizontal cut-off line CL2 on the oncoming lane side. The projection 44 is formed at a position nearer to the optical axis Ax in the left-half portion 43*b* of the upper end edge portion 43. Thus, a light shielding height becomes higher than other portion of the left-side portion 43*b*, and a portion of the horizontal cut-off line CL2 on the oncoming lane side is recessed below a specific point P in the low beam LB. Here, the specific point P is a point below the horizontal cut-off line CL2 on the oncoming lane side in the low beam LB (the specific point P corresponds to, for example, a 50R point (0.86D-3.43R) on a virtual screen in the ECE Regulation), at which the illuminance is required to be equal to or lower than a predetermined maximum value. The projection 44 is provided to make the portion of the horizontal cut-off line CL2 on the oncoming lane side recessed below the specific point P in a concave manner to contribute to form a recession CL2*a*. However, to be precise, the projection 44 and a raised portion 45 (described later) contribute to form the recession CL2*a*.

The raised portion 45 is formed on and extends over the front plate portion 42 arranged below the projection 44. The raised portion 45 is raised toward the front from the vicinity of the upper end of the projection 44 and formed in a step shape (illustrated as dashed lines in FIGS. 2 and 3). An upper end surface 45*a* of the raised portion 45 is formed in a circular arc shape having a predetermined radius of curvature, and forms a connecting portion with the vicinity of the upper end of the projection 44. The upper end surface 45*a* extends from the connecting portion towards the front and away from the focal plane S including the focal point F of the projection lens 5. Further, the upper end surface 45*a* of the raised portion 45 reflects the light having passed above the upper side of the projection 44. Then the reflected light passes through the projection lens 5 and illuminates an illumination region R including an inner region $R_0$ of the recession CL2*a* of the low beam LB.

In the vehicle headlamp 1 having the above configuration, after the light output from the light source 2 is reflected by the reflection surface 31 of the reflector 3, the light is reversely projected through the projection lens 5 in the front direction of the vehicle. Here, a portion of the light to be incident on the projection lens 5 from the reflection surface 31 of the reflector 3 is shielded by the shade 4, so that the low beam LB having the cut-off line CL is formed, which cut-off line CL being a reverse image of the upper end edge portion 43 of the shade 4.

At this time, the projection 44, which projects upward on the left-half portion 43*b* of the upper end edge portion 43, contributes to form the recession CL2*a* recessed below the specific point P of the low beam LB in a concave manner, on the horizontal cut-off line CL2 on the oncoming lane side formed corresponding to the shape of the left-half portion 43*b*. Thus, in the low beam LB, the illuminance of the inner region $R_0$ of the recession CL2*a* including the specific point P is suppressed.

More precisely, the projection 44 and the raised portion 45 raised toward the front from the vicinity of the upper end of the projection 44 contribute to form the recession CL2*a* of the horizontal cut-off line CL2 on the oncoming lane side. That means, the recession CL2*a* is formed by the projection 44 shielding the light and further by the upper end surface 45*a* of the raised portion 45 shielding a portion of the light having passed above the upper side of the projection 44. At this time, the recession CL2*a* is also formed by the light having passed close to points on the upper edge of from the projection 44 to the raised portion 45, which extends towards the front and away gradually from the focal plane S of the projection lens 5. This makes an illumination gradient in the vertical direction in the vicinity of the recession CL2*a* gentle (that is, the vicinity of the recession CL2*a* becomes blurry).

Also at this time, the light shielded by the upper end surface 45*a* of the raised portion 45 is reflected by the same, and illuminates the illumination region R including the inner region $R_0$ of the recession CL2*a* through the projection lens 5. Thus, in the low beam LB, the inner region $R_0$ of the recession CL2*a* is illuminated by an amount of light which prevents the inner region $R_0$ from becoming excessively bright.

Figure 6A:
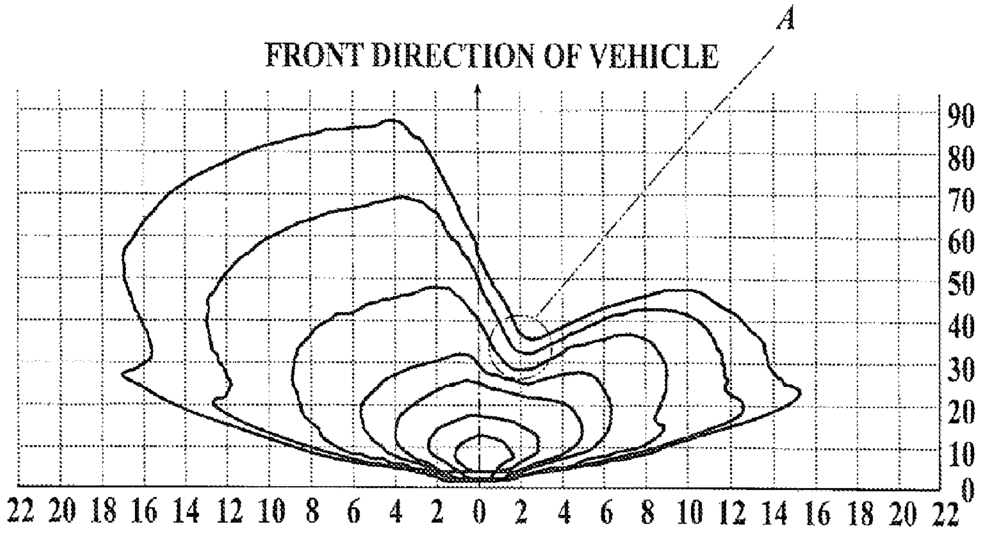
FIG. 6A illustrates an isolux curve illustrating the low beam generated by the vehicle headlamp according to the embodiment when viewed from the top.
Figure 6B:
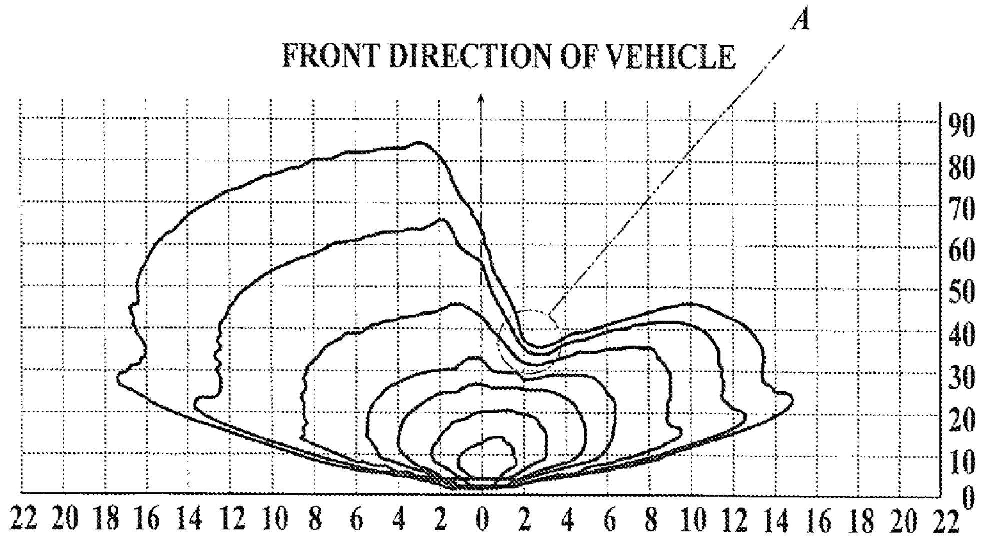
FIG. 6B illustrates an isolux curve illustrating the low beam generated by a shade without a raised portion when viewed from the top.
Figure 7:
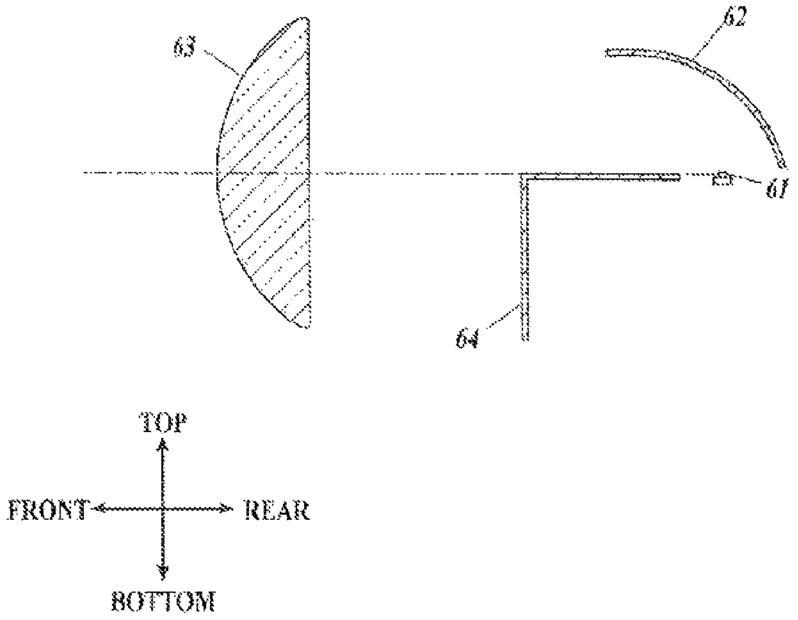
FIG. 7 Conventional Art
FIG. 7 is a side cross-sectional view of a conventional vehicle headlamp.
Figure 8:
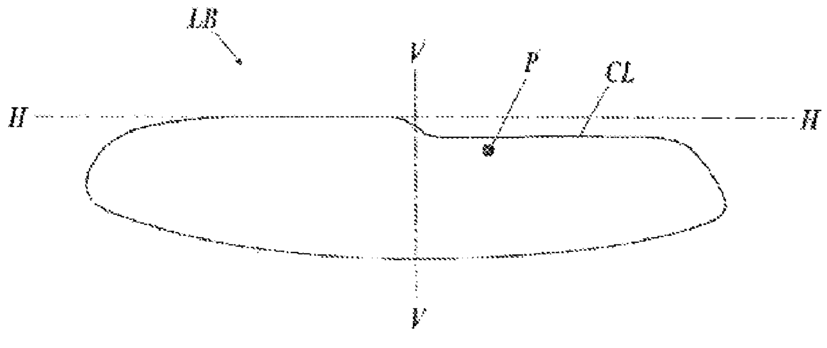
FIG. 8 Conventional Art
FIG. 8 is a view illustrating a low beam generated by the conventional vehicle headlamp.
Figure 9A:
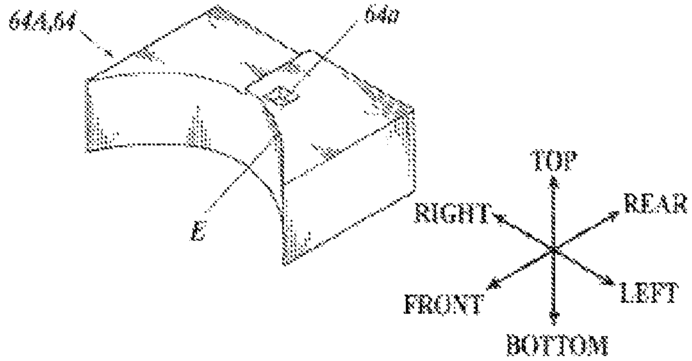
FIG. 9A Conventional Art
FIGS. 9A to 9C are perspective views of respective shades of the conventional vehicle headlamps.
Figure 9B:
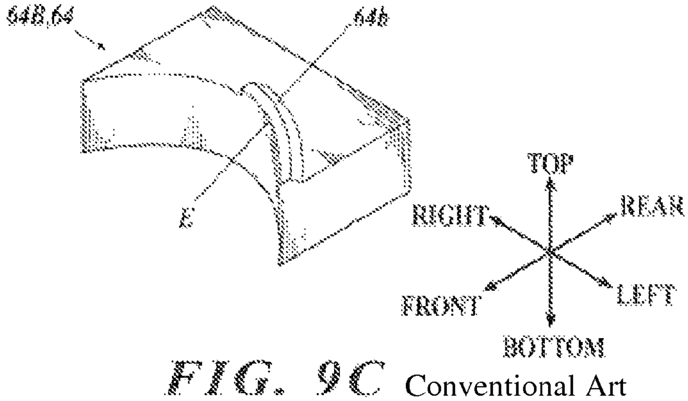
FIG. 9B Conventional Art
Figure 9C:
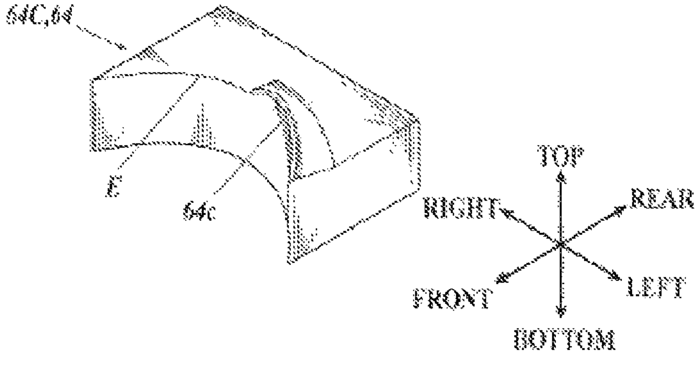
FIG. 9C Conventional Art
Figure 10A:
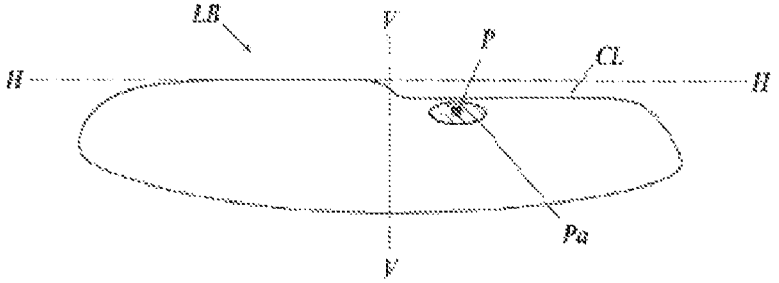
FIG. 10A Conventional Art
FIGS. 10A to 10C are views illustrating low beams generated by respective shades in FIG. 9A to 9C.
Figure 10B:
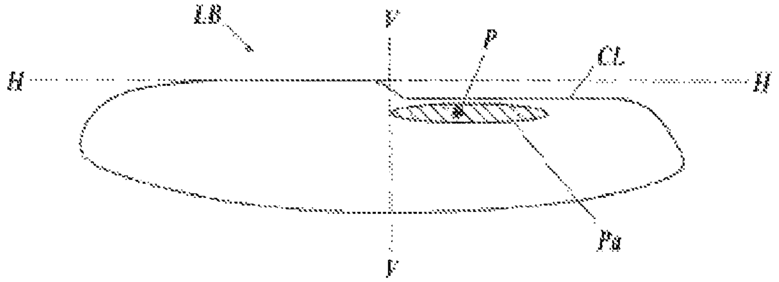
FIG. 10B Conventional Art
Figure 10C:
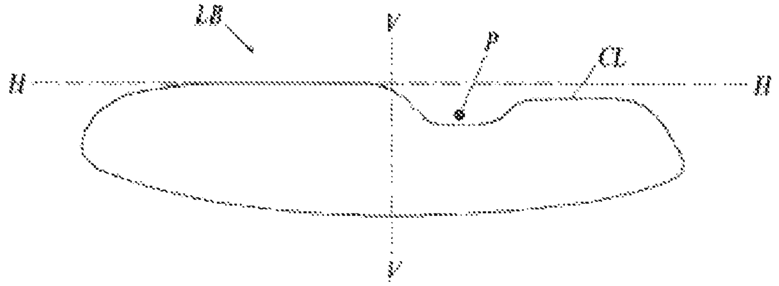
FIG. 10C Conventional Art

Now, a change in the illumination gradient depending on the presence of the raised portion 45 is described by reference to FIGS. 6A and 6B. FIG. 6A illustrates an isolux curve illustrating the low beam LB generated by the vehicle headlamp 1 when viewed from the top. FIG. 6B illustrates an isolux curve illustrating the low beam LB generated by a shade without the raised portion 45 (but the projection 44 is provided) when viewed from the top.

As seen from FIGS. 6A and 6B, when the shade 4 with the raised portion 45 is provided, in a portion of the oncoming lane side of the low beam LB (a right half portion in the drawing), a predetermined region A including the specific point P has a wider contour interval, which means, the illumination gradient is gentler, compared to the shade without the raised portion 45.

As described above, according to the vehicle headlamp 1, the upper end edge portion 43 of the shade 4 which forms the cut-off line CL is provided with the projection 44 upward to form the recession CL2*a* by making a portion of the horizontal cut-off line CL2 on the oncoming lane side recessed below the specific point P in a concave manner. Thus, in the low beam LB, the illuminance of the inner region $R_0$ of the recession CL2*a* including the specific point P is suppressed.

In the projection 44, the raised portion 45 is formed to be raised toward the front direction from the vicinity of the upper end of the projection 44 and to extend in the front direction and gradually away from the focal plane S including the focal point F of the projection lens 5. The raised portion 45 reflects the light that has passed above the upper portion of the projection 44 to illuminate the inner region $R_0$ of the recession CL2*a*. Thus, in the horizontal cut-off line CL2 on the oncoming lane side, the illumination gradient in the vicinity of the recession CL2*a* is made gentle, and an exemplary illumination of light in the inner region $R_0$ of the recession CL2*a* is achieved.

Accordingly, the vehicle headlamp 1 can suppress the illuminance of the specific point P while making the illumination gradient gentle around the specific point P in the low beam LB.

It should be noted that the presently disclosed subject matter is not limited to the above-described embodiment but also applicable to other embodiments, and the embodiments can be appropriately modified without departing from the spirit and scope of the invention.

For example, although not mentioned in the above embodiment, a raised amount of the raised portion 45 towards the front direction and a shape of the upper edge surface 45*a* can be appropriately modified according to a desired illumination gradient in the vicinity of the recession CL2*a* and a desired amount of light illuminating the inner region $R_0$ of the recession CL2*a*.

Further, considering a general illumination mode of a low beam and for the sake of simpler description, the cut-off line CL is described as the upper end line (borderline between light and dark regions) of the low beam LB. However, only in the inner region $R_0$ of the recession CL2*a*, the upper end line of the illumination region R formed by the raised portion 45 reflecting the light is described as the upper end line (borderline between light and dark regions) of the low beam LB.

Still further, the upper end edge portion 43 of the shade 4 is provided to position in the vicinity of the focal point F of the projection lens 5. Here, "in the vicinity of the focal point F" means that the vicinity of the focal point F includes the position of the focal point F.

The entire disclosure of Japanese Patent Application No. 2011-186678 filed on Aug. 30, 2011 including description, claims, drawings, and abstract are incorporated herein by reference in its entirely.

While the presently disclosed subject matter has been described with reference to exemplary embodiments, it is intended that the presently disclosed subject matter not be limited by any of the details of the description therein but includes all the embodiments which fall within the scope of the appended claims.

What is claimed is:

1. A vehicle headlight to generate a low beam in front direction of a vehicle, comprising:

a light source;

a reflector to reflect light output from the light source in the front direction;

a projection lens provided in front of the reflector to project the light having been reflected by the reflector and incident on the projection lens in the front direction; and a shade provided between the reflector and the projection lens to shield a portion of the light to be incident on the projection lens, the shade including:

an upper end edge portion provided in the vicinity of a focal point of the projection lens to form a cut-off line that is an upper end line of the low beam, the upper end edge portion having a projection that projects upward to form a recession of the cut-off line by making a portion of the cut-off line recessed below a specific point in the low beam in a concave manner, and a raised portion to reflect light having passed above the projection to illuminate an inner region of the recession by the light having passed above the projection, wherein the raised portion is formed on and extends over a front plate portion arranged below the projection, wherein the raised portion is raised toward the front from the vicinity of the upper end of the projection and formed in a step shape, wherein an upper end surface of the raised portion is formed in a circular arc shape having a predetermined radius of curvature, and forms a connecting portion with the vicinity of the upper end of the projection, and wherein the upper end surface of the raised portion extends from the connecting portion towards the front and away from the focal plane including the focal point of the projection lens.

* * * * *